UNITED STATES PATENT OFFICE.

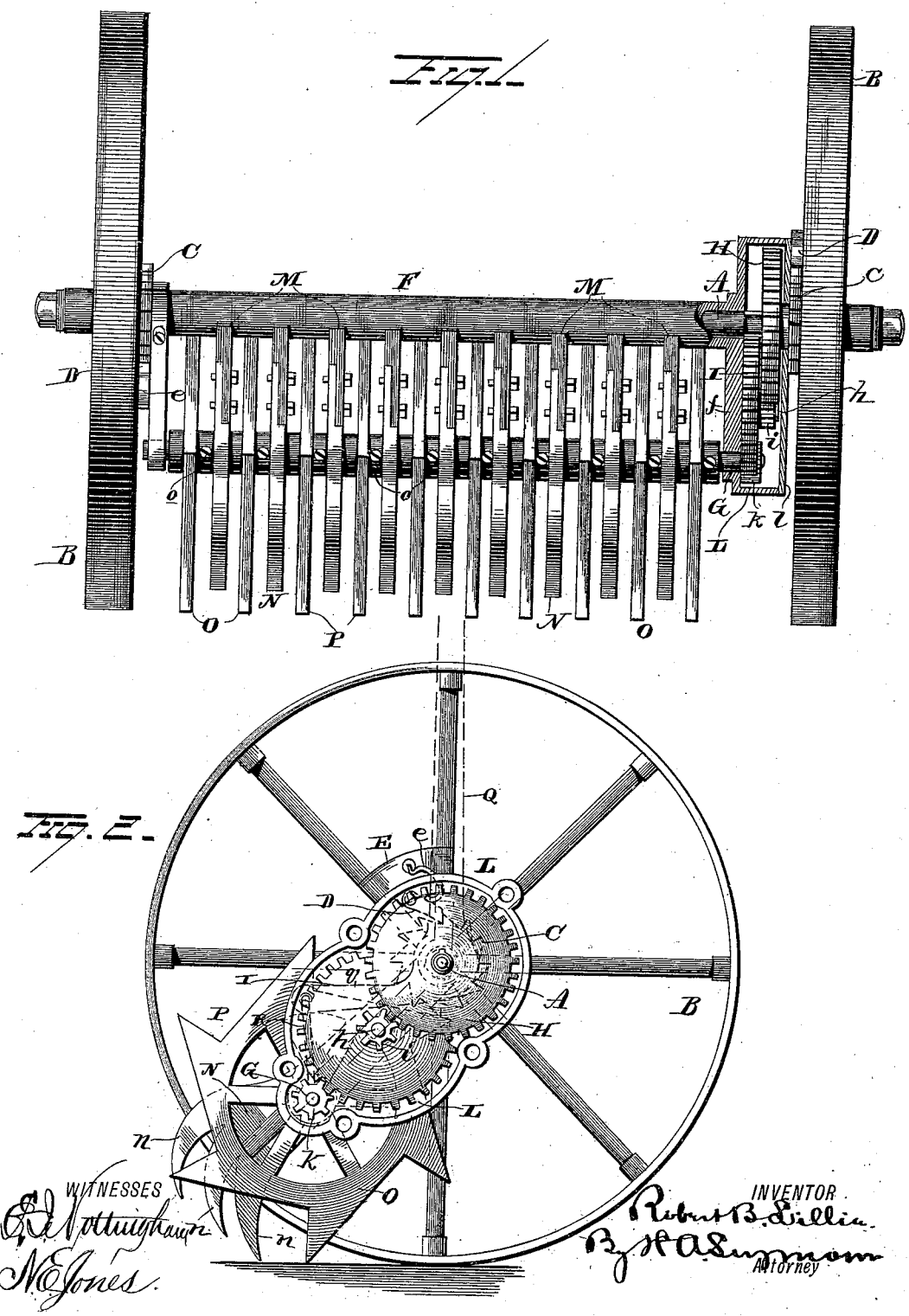

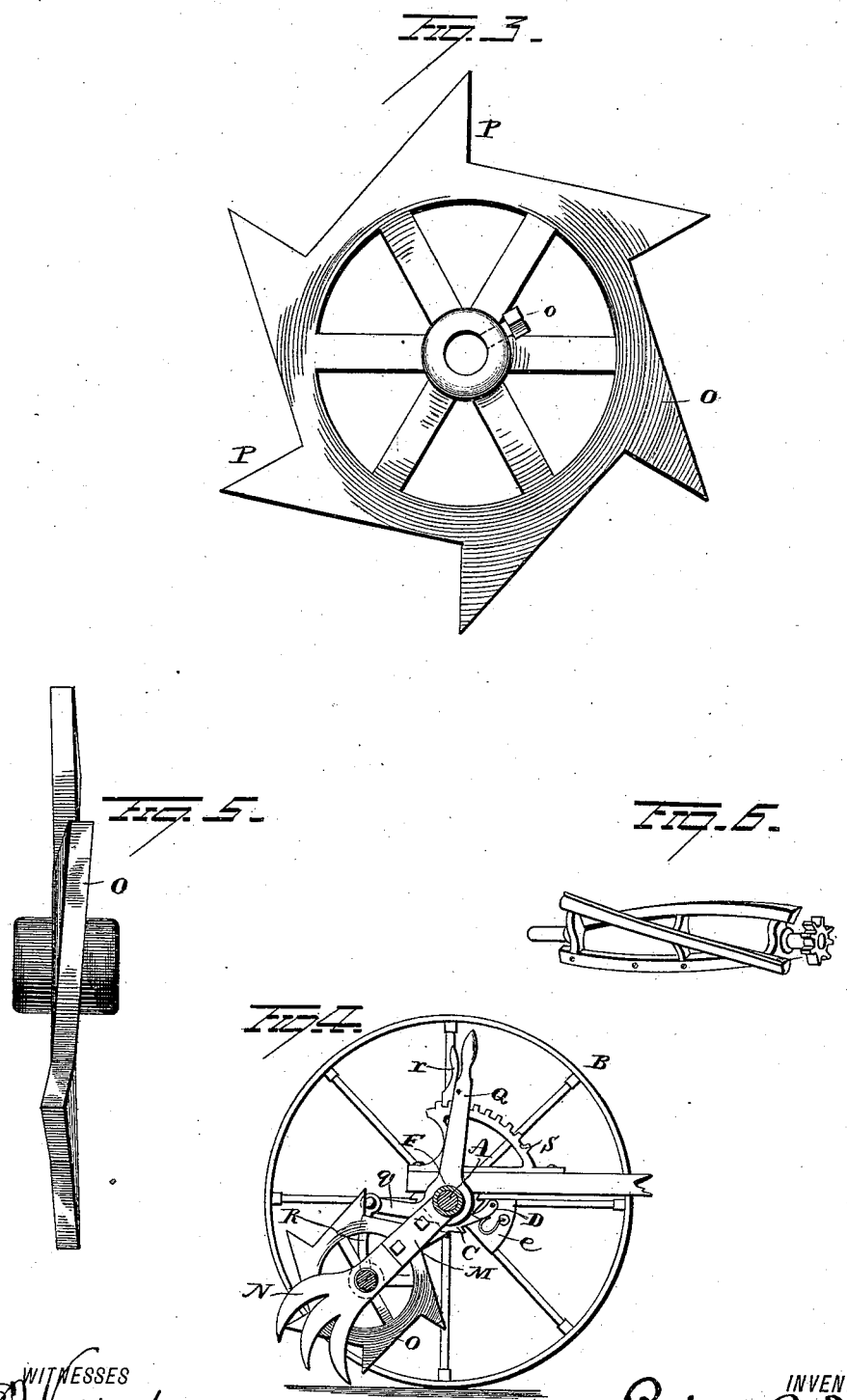

ROBERT B. LILLIE, OF HANOVER, NEW HAMPSHIRE.

SOIL-PULVERIZER.

SPECIFICATION forming part of Letters Patent No. 355,405, dated January 4, 1887.

Application filed April 22, 1886. Serial No. 199,758. (No model.)

*To all whom it may concern:*

Be it known that I, ROBERT B. LILLIE, of Hanover, in the county of Grafton and State of New Hampshire, have invented certain new and useful Improvements in Soil-Pulverizers; and I do hereby declare the following to be a full, clear, and exact description of the invention, such as will enable others skilled in the art to which it appertains to make and use the same.

My invention relates to an improvement in soil-pulverizers.

The object is to provide a wheeled cultivator in which a series of revolving disks shall shear, saw, or plane the soil, and more particularly to provide a simple, effective, and economical construction of shafts, cutters, and operating-gear.

With these ends in view my invention consists in certain features of construction and combinations of parts, as will be hereinafter described, and pointed out in the claims.

In the accompanying drawings, Figure 1 is a plan view of the machine. Fig. 2 is an end view with ground-wheel partially removed. Fig. 3 is a detached view of one of the toothed disks. Fig. 4 is a vertical longitudinal section showing lever for regulating depth of cut and to elevate teeth. Fig. 5 is a detached view of one of the disks with teeth set to effect a saw cut, and Fig. 6 is a detached view of a planer-disk.

A represents an axle, on the ends of which the ground-wheels B are loosely mounted. A pair of ratchet-toothed wheels, C, are secured on the axle A, one in close proximity to the inner end of each ground-wheel hub, and are conveniently locked against a rotary movement on the axle by feather and groove or other equivalent device. A dog, D, is pivoted to the inner end of each of said hubs, or to a plate, E, rigidly secured to and flush with the end of the hub. The dog D is held in contact with the ratchet-toothed wheel by means of a spring, e. Thus as the ground-wheels B rotate forwardly the dogs D will lock the wheels to the axle and cause the latter to rotate therewith; but when the wheels are rolled backwardly the dogs D will slide over the ratchet-teeth on the wheels C without causing the axle to rotate.

On the axle A, between the ratchet-toothed wheels C, is loosely mounted the sleeve F. To the ends of the sleeve F are firmly secured the rearwardly-extending arms *f*, in the free ends of which is journaled the shaft G. At one end there is a short space between the arm *f* and the wheel C, and a spur-wheel, H, is rigidly secured on the axle A at that point. The spur-wheel H meshes with a pinion, *i*, on the hub of a second spur-wheel, I. The latter is loosely mounted on a stub-axle, *h*, set in the arm *f*. The spur-wheel I meshes with a spur wheel or pinion, K, rigidly secured on the end of the shaft G.

By means of the above-described system of gear the comparatively slow rotary movement of the axle A causes the shaft G and whatever disks are secured thereon to rotate rapidly.

The gearing H, I, *i*, and K is tightly housed in an elongated box, L, secured to the arm *f*. The cover *l* of the box L is made removable for gaining access to the gear. The object of the box L is to keep dirt and grit from clogging and cutting out the journals and teeth of the gear, which is quite a serious matter where a machine is constantly employed in stirring up the soil.

The sleeve F is provided with a series of short rearwardly-extending arms or lugs, M, located at suitable intervals throughout its length, to which are removably secured the ends of the shanks of a series of cultivating-teeth, N. The said shanks of the teeth N are also loosely mounted on the shaft G, and their cutting ends consist of one or more claws, *n*. If the teeth N terminate in more than one claw, the additional claws are located in the same plane, one above the other, as shown. The number of claws is preferably three.

Between the teeth N toothed disks O are secured firmly to the shaft G, conveniently by means of set-screws *o*, which extend through their hubs and impinge against the shaft. The teeth P on the disks O are ratchet or saw-tooth shaped, and are caused to revolve in the same direction as the ground-wheels in traveling forwardly. The claws *n* are set concave edge toward the front, and therefore tend to dig and draw the turf or soil forward, while the disks tend to force the loosened turf, trash, and soil backwardly between the claws *n*. The result is, that the turf, trash, and soil are pulverized by shearing cuts, caused by the meeting of the teeth on the disks and the claws n.

The teeth on the disks may be bent alternately to the right and left, as saw-teeth are set, and as shown in Fig. 5. It is found advantageous to have such a set of disks on hand, to be used in the place of the ordinary disk, for special work. When such disks are employed, the teeth N may be removed or allowed to remain, as found most effective.

The planer-disk represented in Fig. 5 may also be substituted for either the bent-toothed or ordinary disk, where it is desired to plane the soil to a certain depth.

To regulate the depth of the cut and to elevate the teeth N and disks in transporting the machine to and from the field, an operating-lever, Q, is provided. The lever Q is loosely mounted on the sleeve F, and is provided with a rearwardly-extending arm, q, which is connected with the shaft G by a link, R. The handle of the lever is provided with a spring-dog, r, by means of which it may be locked in the desired rocking adjustment to a sector-bar, S, attached to the tongue or frame-work. The frame-work for attaching draft to the machine may be of any approved construction. A convenient form is a rectangular-shaped skeleton frame loosely mounted on the sleeve F, and having the tongue and driver's seat secured thereto.

Having fully described my invention, what I claim as new, and desire to secure by Letters Patent, is—

1. The combination, with the main axle and a rotary shaft secured in the arms of a sleeve loosely mounted on the axle, of a set of bent-toothed disks removably secured on the rotary shaft, adapted to saw the soil, substantially as set forth.

2. The combination, with the main axle and a rotary shaft secured in the arms of a sleeve loosely mounted on the axle, of a set of claw-teeth attached to the said sleeve and loosely mounted on the rotary shaft, and a set of toothed disks secured on the rotary shaft alternately with the claw-teeth, substantially as set forth.

3. The combination, with the main axle and a shaft secured in the arms of a sleeve loosely mounted on the axle, of the stationary teeth secured loosely on the rotary shaft, the rotary teeth secured rigidly on the rotary shaft, and the system of multiplying-gear connecting the axle and the rotary shaft, substantially as set forth.

4. The combination, with the armed sleeve loosely mounted on the axle, the rotary shaft journaled in the arms, the claw-teeth secured to the sleeve and loosely mounted on the rotary shaft, and the toothed disks secured on the rotary shaft, of the multiplying-gear connecting the axle and rotary shaft and the rocking box adapted to closely house the gear, substantially as set forth.

5. The combination, with the sleeve loosely mounted on the axle and having arms, the swinging rotary shaft journaled in the arms and carrying the toothed disks, and the axle to which the swinging rotary shaft is secured, of the ground-wheels loosely mounted on the axle, the ratchet-wheels and spring-actuated dogs for locking the ground-wheels to the axle, and the angle-lever for elevating and depressing the rotary shaft and toothed disks, substantially as set forth.

In testimony whereof I have signed this specification in the presence of two subscribing witnesses.

R. B. LILLIE.

Witnesses:
SAMUEL W. COBB,
A. H. ROBERTS.